June 6, 1967  F. FRUENGEL  3,323,409
SYSTEM FOR MEASURING THE OPTICAL PERMEABILITY OF FLUIDS
Original Filed May 4, 1959

INVENTOR
Frank Fruengel
by:
Michael S. Striker
Attorney

United States Patent Office 3,323,409
Patented June 6, 1967

3,323,409
SYSTEM FOR MEASURING THE OPTICAL
PERMEABILITY OF FLUIDS
Frank Fruengel, Herwigredder 105a,
Hamburg-Rissen, Germany
Continuation of application Ser. No. 810,684, May 4,
1959. This application Jan. 2, 1963, Ser. No. 249,562
Claims priority, application Germany, May 6, 1958,
F 25,696
14 Claims. (Cl. 88—14)

This is a continuation of my copending application Serial No. 810,684, filed May 4, 1959, entitled "System for Measuring the Optical Permeability of Fluids," now abandoned.

The present invention is essentially an improvement and further development of a previously proposed system for transmitting light signals through absorbing media by spark light impulses which is described, e.g. in the German Patent No. 836,410, published Apr. 10, 1952. In this system, a spark light transmitter and a corresponding receiver are used, the transmitter including a storage condenser, means for charging this condenser and a discharge circuit of low inductance for the condenser including spark gap means and means associated with the discharge circuit for causing discharges of the condenser through the spark gap means in the form of electric sparks. The receiver is positioned to receive the spark light from the transmitter and includes photo-electric means for converting light impulses into electric energy impulses, a frequency band amplifier associated with the photo-electric means and tuned to amplify substantially all harmonics of a spark light intensity wave, and finally, an output circuit connected to the amplifier including an indicating device for giving perceptible signals.

One of the main objects of the present invention is to provide for a system by which the optical permeability of gaseous and liquid fluids, or in other words, the absorption of light in such fluids, is determined quantitatively with the aid of high intensity light pulses as obtainable from the above mentioned system and transmitted through said fluids.

It is another object of this invention to provide for a system of the type set forth in the preceding paragraph and being particularly reliable and efficient even under adverse climatic conditions.

It is still another object of this invention to provide for a system as set forth above which is suitable to indicate and to record the degree of visibility in a given area and medium, including indications of minute changes of visibility with utmost accuracy.

According to the invention, visibility in terms of distances or in terms of the degree of absorption is measured by means of objectively recording instruments. For this purpose, a very narrow pencil of light enclosed within an angle of only about 1° is used in order to eliminate as much as possible stray light and in order to make sure that only the visibility is measured which depends upon the degree of absorption or extinction of the direct beam extending, e.g., between a signaling lamp and the receiving eye or instrument. Of particular interest is a current recording of prevailing visibility along the landing strips of airports. In this particular field, visibility measuring instruments of known type are customarily arranged about 3 to 9 feet above the level of the landing strip and adjacent to the latter near the touch-down point of landing airplanes. It is customary to use a more or less standardized observation distance of about 500 feet. In these known arrangements, an incandescent lamp is used as transmitter, and a receiver comprising photo-electric means adjusted to the spectrum of the lamp in connection with a recording device is used. Conventionally, the signaling light is modulated in order to obtain a distinction from the general daylight. The drawback of the known equipment is that, when fog develops, the transmission of signals is soon interrupted as the absorption and diffusion of light increases, so that in this manner the process of measuring visibility is discontinued because, under such conditions, intensity reductions in the order of $10^{-6}$ and more may occur. However, by means of the method utilizing high intensity light pulses as described in the above mentioned German Patent No. 836,410, it is possible to overcome successfully and without difficulties such intensity reductions of the signal beam and to carry out accurate and reliable measurements within the entire climatically possible range between good visibility and dense fog. Such a performance is particularly important because it permits to measure currently an increase or decrease of visibility even when the visibility is generally poor, whereby it is possible to predict when, e.g., an airplane will be able to start again.

In order to accomplish the desired performance of the proposed system, the following conditions must be established at the transmitter and at the receiver.

In order to be capable of determining visibility quantitatively, the pulse transmitter, i.e. its light flash amplitude, must be substantially constant. According to this invention, a receiver arrangement is used which is adapted to cooperate with a transmitter in which the electrodes of the spark gap means of the transmitter are dimensioned for handling considerably greater energies than those used in operation. If a spark gap means is built for handling 10 joule flash energy, the life of the electrodes is, by exposing them to a load of only 1/100 joule, increased at least 1000 times as compared with a 10 joule load; under the same conditions, if the electrodes are arranged within a fused discharge vessel or within a demountable spark chamber, the blackening of the walls of the enclosure due to pulverized electrode material is accordingly reduced.

With above objects in view, the invention provides in a system for measuring the straight-line light transmittancy of gaseous and liquid fluids by means of light transmission along a straight-line path from a transmitter over a predetermined distance through such fluids, a receiver apparatus, comprising in combination, photo-sensitive electric means for receiving said transmitted light; light-directing means including a plurality of elongated ducts extending parallel with said straight-line path for directing respectively fractions of the light received by the receiver apparatus when exposed to said transmitted light as fractional pencils of light toward said photo-sensitive means, said ducts being dimensioned to substantially preventing stray light from reaching said photo-sensitive means, optical means interposed in the path of light between said ducts and said photo-sensitive means for concentrating said plurality of fractional pencils of light into a single beam of light, and light stop means interposed between said optical means and said photo-sensitive means and located at the focus of said optical means for passing said beam of light to said photo-sensitive means with a light cone angle of up to 1°; blower means for forcing a current of air through said ducts in outward direction for preventing light-obstructing matter from penetrating into said ducts; and a housing surrounding said photo-sensitive electric means, said blower means and said light-directing means and having an opening for admitting said transmitted light to said plurality of elongated ducts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
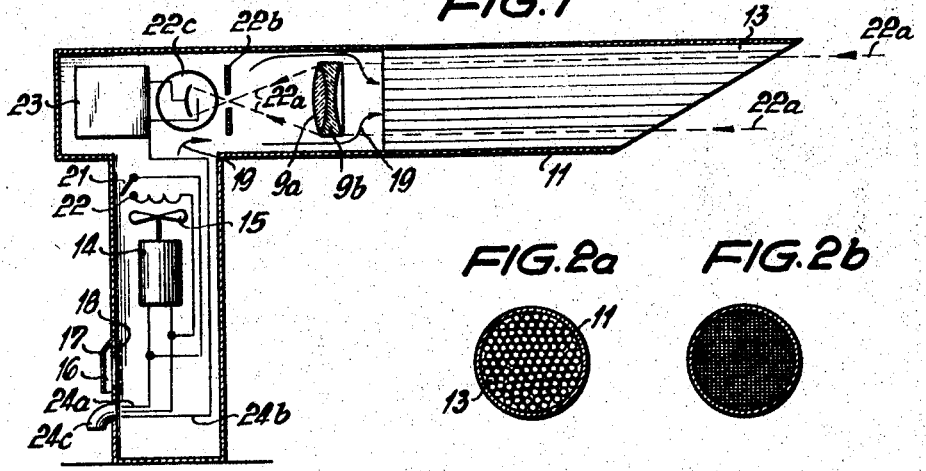
FIG. 1 is a schematic diagram, partly in section, of a receiver according to the invention.
Figure 2A:
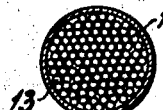
FIGS. 2a and 2b illustrate two alternatives of a detail of this receiver.
Figure 2B:

In order to make the receiver insensitive to drifting snow, dust or the like, a structural arrangement according to FIG. 1 is provided by the invention. The whole receiver is enclosed within a housing 11 having an upright tubular base and a horizontal extension. The entire electric receiver circuit is represented by the block 23. The light-receiving portion or extension of the housing 11, directed toward the transmitter, is filled by a grid or rather by a plurality of tubes 13, shown in end view by FIG. 2a. The whole optically utilizable cross section of the housing extension may also be subdivided or honeycombed by intersecting partitions, as illustrated in end view by FIG. 2b. In the case of wind blowing against the receiver, the velocity of the air is substantially reduced by such an arrangement. While small air velocities are hardly reduced by such longitudinal ducts, turbulence develops immediately in the case of strong winds so that only an insignificant laminar flow of air can develop within the tubes or ducts in direction toward the transmitter equipment. Preferably, a propeller 15 driven by a blower motor 14 arranged within the housing 11 counteracts such a slow flow of air, the blower system sucking in fresh air through an intake opening 16 protected by an overlapping cover 17 and provided with a protective screen 18, said fresh air being subjected to the same wind pressure as the ducts 13 but being supplied by the blower system with additional pressure. Therefore, the air is always moved in direction of the arrow 19 and any snow or dust that may appear at the open end of the arrangement of ducts 13, will be blown out. In this manner, any impairment of the transmitted beam of light by clogging of the ducts is prevented. In addition, it is advisable to arrange in the housing 11 an electrical heating device 20 with a temperature-sensitive switch 21 so that the arrangement is additionally heated, e.g., when the temperature drops below freezing point.

The receiver may be operated also without the heating and blower means being active, whenever this particular auxiliary equipment is not called for in view of conditions existing at the location of the receiver. The provision of tubular or other elongated ducts 13 in the receiver device performs, however, an additional function. Stray light which, for instance, in the case of presence of fog, due to diffusion, would enter the receiver from directions considerably differing from the direction of the signal beam (strong fog is or appears uniformly white in all directions, but never dark) is eliminated. For this purpose, the walls of the tubes or partitions forming the ducts should be blackened. If, for instance, the length of the ducts is chosen in relation to their inner diameter in such a manner that geometrically the cone of light reception is limited to 5°, then stray light is eliminated to a degree represented by the ratio between the squares of the angles involved, i.e. $180^2:5^2$. In order to obtain a 1° receiving angle or opening, the lens system 9a, 9b together with the aperture stop 22b interposed between the ducts 13 and the photo-electric means 22c, has to have in this case a masking effect only in the angular proportion 5:1. In this manner, the requirements of transparency of the lens are reduced. This is of importance because, if the device is supposed to yield results or indications of a 6-digit accuracy, any diffused or stray light impinging on the lens would be inevitably transmitted to the optical axis and affect the indication since even the best optical glass has still an ever so slightly matted surface. This difficulty, however, can be overcome by providing for a screening effect by means of the ducts geometrically formed in a satisfactory manner and simultaneously serving to reduce the velocity of air currents penetrating the inlet opening of the receiver. As compared with ordinary aperture stops used in connection with lens systems, the arrangement according to the invention, results in a shorter length of the structure because the screening arrangement with ducts requires a shorter length than would be required if a plurality of annular stops were arranged as an axially spaced series thereof. In this manner, the whole device having a smaller overall surface area facing in lateral direction offers less resistance to wind blowing in lateral direction which results in stability of the apparatus in case of lateral winds and very favorable for reliable operation. The light rays reaching the receiver travel in the direction of the arrows 22a and reach the lens system 9a, 9b. Should it be desired to measure the absorption coefficient concerning the ultraviolet part of the spectrum, the optical system is to be made of quartz or other material transparent for ultraviolet rays, which material may even comprise certain synthetic substances. The aperture stop 22b reduces the bundle of rays to the desired small angular amount of, e.g. 1°, whereafter the resulting pencil of received light impinges upon the photo-electric receiving element 22c connected with the electric receiver circuit 23 indicated in this FIG. 1 only as a block and explained further below. The cable connections of the device are indicated at 24a and 24b and are taken to the outside, preferably at one side of the housing 11 in a manner protecting the cables against water. The cables carry the power supply voltage, the part whereof which supplies the amplifier means being stabilized if desired, and the output line of the receiver circuit which output ordinarily is fed to a recording instrument located within a building.

Figure 3:
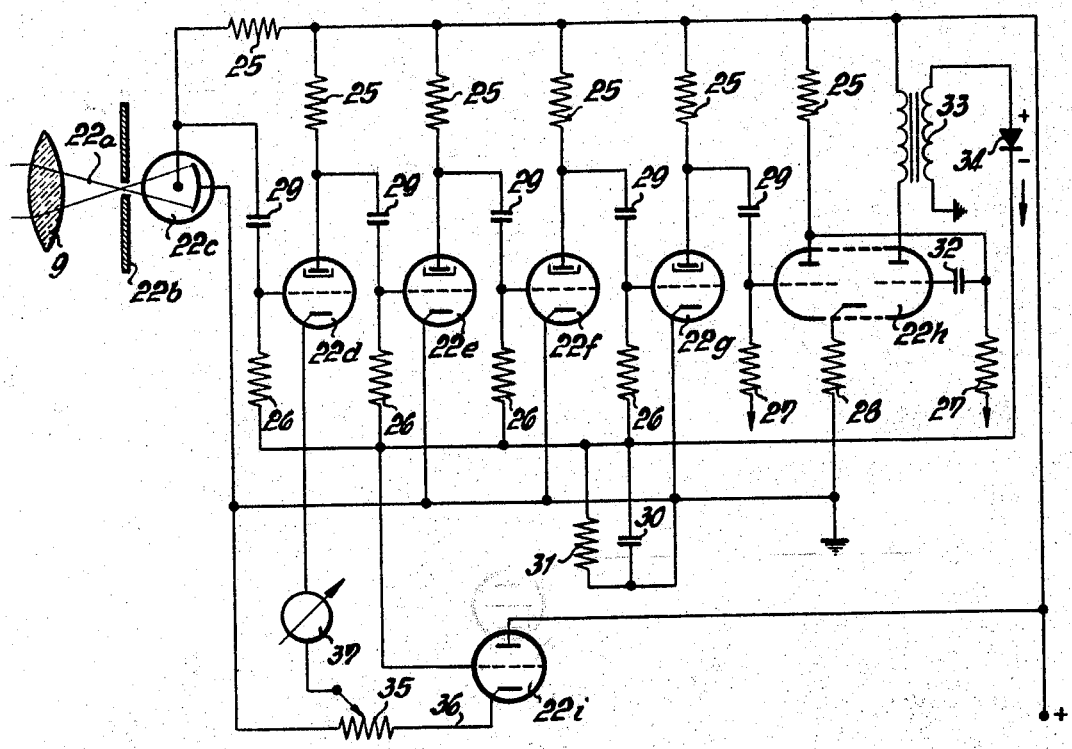
FIG. 3 is a schematic circuit diagram of a preferred form of the receiver according to the invention.

FIG. 3 illustrates in detail the circuit of a receiver capable of carrying out measurements within a wide range, e.g. covering 8 decimal digits. The photo-cell 22c arranged behind the objective 9 and within the diverging bundle of rays 22a passing through the aperture stop 22b furnishes signals to the tube 22d via the first condenser 29 for being amplified, the signal being further amplified in stages by the tubes 22e, 22f, 22g. These four amplifier tubes have a logarithmic characteristic and are connected with each other by coupling condensers 29; the anode resistors are marked 25 and the grid leak resistors are marked 26. The screen grids and cathodes are supposed to be connected in the usual manner which does not require description. The grid bias potential is furnished by a large condenser 30, having a high insulating resistance and being dimensioned so as to be discharged via a high resistance 31 with a time constant of about 2 seconds. Connected beyond the last amplifier tube 22g is a multi-vibrator tube 22h associated with a cathode resistor 28, a coupling condenser 32, and leak resistors 27. The tube 22h operates as a monostable multi-vibrator. As is known, each voltage impulse furnished by the tube 22g and exceeding a predetermined minimum voltage causes the second multi-vibrator stage to carry an increased current until the tube is saturated, whereafter this current is maintained through a time period determined by the cooperation of the elements 27–32. This current pulse, the value of which in coulombs is evidently independent of the quality of the signal releasing it, passes through the transformer 33, the secondary winding of which feeds the current pulse via the rectifier 34 in the direction of the arrow as a negative potential to the condenser 30. Consequently, a constant negative increase of potential at the condenser 30 corresponds to each activation of the multi-vibrator. Therefore, if a constant sequence of signals is received by the photo-cell 22c, the grid bias potential applied to the four amplifier tubes shown in FIG. 3 decreases steadily until the amplification effected by the tubes 22c, 22d, 22e, 22f, 22g is reduced to such an extent that the finally delivered voltage impulse is not capable any more to activate the multi-vibrator tube 22h. Then, the potential at the condenser 30 drops due to discharge across the resistor 31 until the amplification again increases to such an extent that the multi-vibrator responds to a signal. Consequently, the potential at the condenser 30 is the logarithm of the intensity of the signal arriving at the receiver.

Although a similar control arrangement is known for radio receivers for undamped oscillations, an arrangement of this type has never been proposed for measuring the peak potential in connection with light pulses. It has been found that, by using conventional amplifier tubes having a certain control characteristic, the amplification can be controlled with a straight logarithmic characteristic within the range of 2.5 to 3 decimal digits, so that by using four amplifier tubes, an amplifying characteristic of strictly straight logarithmic form can be reliably obtained in the range of 8, and frequently even 12, decimal digits. This corresponds to a control range from $10^{-2}$ to $10^6$ on the basis of an amplification per stage amounting to approximately 30, to $10^3$ with two stages and $10^6$ with four stages. Thus, in view of the very high peaks of the light pulses in case of perfect visibility and in view of the possibility of transilluminating even strongly absorbing media (as explained, e.g. in the German Patent No. 836,410) it is possible to measure and to continuously record visibility ranging between intensive fog and ideal visibility. Preferably, the power for the recording instrument is derived in a manner known per se through the amplifier tube 22i by conversion of the control voltage of the amplifier set through cathode amplification into a strong current. The low-ohm cathode resistor 35 is provided with a variable tap and may be arranged in the neighborhood of the recording instrument 37 so that by adjusting the position of the tap the recording instrument can be adjusted to the above described circuit. In order to compensate for aging of the tubes, the amplifier can be readjusted in generally known manner by adding a variable additional potential for biasing the condenser 30.

The receiver system according to the invention designed for quantitatively measuring the absorption of light by the transilluminated media may be used advantageously also for the purpose of measuring visibility between flying airplanes and ground installations, i.e. in oblique direction, as well as for measuring the ozone content of the atmosphere by carrying out the measurement in the ultra-violet part of the spectrum, and finally for all other purposes where transillumination and simultaneous recordings are to be measured over a wide range, e.g. also in liquids.

The receiver system can be calibrated in the following manner: to imitate the condition of maximum or unlimited absorption, it suffices simply to switch off the transmitter; to imitate the condition of absorption O a normalized impulse generator, e.g. a simple time-base relaxation circuit may be connected with the grid of the first amplifier tube, or some small, light pulse generator may be caused to act directly on the photo-cell.

It will be understood that each of the elements described above, or two or more together, may also find a useful application in other types of systems for measuring the optical permeability of fluids differing from the type described above.

The ideal case should always be that the transmitter as well as the receiver has a pencil-like small angle aperture in emitting light and for receiving light. Also both units should have blowers for cleaning the plurality of elongated ducts, situated before or being part of the optical system. The optical means of the receiver are more important than those of the transmitter. The receiver corresponds to the human eye in observing the range of visibility. Therefore, in several cases it is sufficient to design only the receiver with a system comprising a blower and light scatter eliminating elongated ducts. A further modification of the receiver is possible by correcting the primary logarithmic indicating current or voltage in direction of the desired visibility range in case of measuring atmospheric visibility. Using an ideal linear logarithmic recorder system, 80% of the width of the recording paper will be filled with recordings concerning the visibility range in haze or fog e.g. in the range between 120 and 1200 feet, and only about 20% of the width will carry recordings concerning the visibility range between 1200 feet and infinity. Often it is desired to spread this part of the recorded curve, e.g. to 50% of the paper width. In this case with well known circuit means a part of the logarithmic scale can be compressed from 80% to 50% and, the other part thereof can be spread from 20% to 50%.

One of the well known means of correcting linear current diagrams to nonlinear character is the possibility of using in the anode circuit of the last tube an abnormally increased anode resistance effecting an overtriggering of the tube. Another possibility is to shunt the measuring instrument or the recorder coil with a thermistor (controlled current resistor). Also it is possible to combine the recorder with a relay preset to a certain current. In case the measuring current drops below the pre-set value the relay switches and starts an alarm, e.g. in case of night operation designed to observe visibility or fog.

For desired extreme high sensitivity for great visibility ranges it is preferable to enlarge the base line between transmitter and receiver, say from a distance of 500 feet, to a distance of 1500 feet. In this case all indicating values are multiplied by the factor 3.

While the invention has been illustrated and described as embodied in a system for measuring the optical permeability of gaseous and liquid fluids by means of light pulses transmitted through said fluids, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a system for measuring the straight-line light transmittancy of gaseous and liquid fluids by means of light transmission along a straight-line path from a transmitter over a predetermined distance through such fluids, a receiver apparatus, comprising in combination, photo-sensitive electric means for receiving said transmitted light; light-directing means including a plurality of elongated ducts extending parallel with said straight-line path for directing respectively fractions of the light received by the receiver apparatus when exposed to said transmitted light as fractional pencils of light toward said photo-sensitive means, said ducts being dimensioned to substantially preventing stray light from reaching said photo-sensitive means, optical means interposed in the path of light between said ducts and said photo-sensitive means for concentrating said plurality of fractional pencils of light into a single beam of light, and light stop means interposed between said optical means and said photo-sensitive means located at the focus of said optical means for passing said beam of light to said photo-sensitive means with a very acute light cone angle substantially smaller than that of said individual fractional pencils of light; blower means for forcing a current of air through said ducts in outward direction for preventing light-obstructing matter from penetrating into said ducts; a housing surrounding said photo-sensitive electric means, said blower means and said light-directing means and having an opening for admitting said transmitted light to said plurality of elongated ducts, and an amplifier arrangement connected with said photo-sensitive means and capable of delivering an output current as a function of the amplitudes of said light pulses received by said photo-sensitive means through said beam of light and being indicative of the straight-line transmittancy of the atmosphere existing between said transmitter and receiver means, and indicator means for indicating said function of the amplitudes of a plurality of received light pulses.

2. In a system for measuring the straight-line light transmittancy of gaseous and liquid fluids by means of light pulses transmitted along a straight-line path from a transmitter over a predetermined distance through such fluids, a receiver apparatus, comprising in combination, photo-sensitive electric means for receiving said light pulses; light-directing means including a plurality of elongated ducts extending parallel with said straight-line path for directing respectively fractions of the light received by the receiver apparatus when exposed to said transmitted light as fractional pencils of light toward said photo-sensitive means, said ducts being dimensioned to limit the cone of receivable light of said fractional pencils of light to an acute angle of up to 5°, optical means interposed in the path of light between said ducts and said photo-sensitive means for concentrating said plurality of fractional pencils of light into a single beam of light, and light stop means interposed between said optical means and said photo-sensitive means and located at the focus of said optical means for passing said beam of light to said photo-sensitive means with a very acute light cone angle substantially smaller than that of said individual fractional pencils of light and with an upper limit of 1°; blower means for forcing a current of air through said ducts in outward direction for preventing light-obstructing matter from penetrating into said ducts; a housing surrounding said photo-sensitive electric means, said blower means and said light-directing means and having an opening for admitting said transmitted light to said plurality of elongated ducts, and an amplifier arrangement connected with said photo-sensitive means and capable of delivering an output current as a function of the amplitudes of said light pulses received by said photo-sensitive means through said beam of light and being indicative of the straight-line transmittancy of the atmosphere existing between said transmitter and receiver means, and indicator means for indicating said function of the amplitudes of a plurality of received light pulses.

3. A system as claimed in claim 1, wherein said amplifier arrangement has amplifier means connected with said photo-sensitive means and capable of delivering an output current proportional to the logarithm of the intensity of said light pulses received by said photo-sensitive means through said beam of light, said amplifier means comprising a series of broad-band electronic amplifying devices having a logarithmic characteristic, and a control circuit including multivibrator means, transformer means connected to the output of said multivibrator means and rectifier means connected to the output of said transformer means so as to cooperate for controlling said amplifier tubes by negative voltage pulses sequentially derived from the pulse amplitude output of said series of electronic amplifying devices, so that said output current is indicative of the straight-line light transmittancy of a fluid existing between said transmitter and receiver means.

4. A system as claimed in claim 1, wherein said amplifier arrangement has amplifier means connected with said photo-sensitive means and capable of delivering an output current proportional to the logarithm of the intensity of said light pulses received by said photo-sensitive means through said beam of light, said amplifier means comprising a series of broad-band electronic amplifying devices having a logarithmic characteristic, and a control circuit including multivibrator means connected to the output of said multivibrator means, transformer means connected to the output of said transformer means so as to cooperate and rectifier means for controlling said electronic amplifying devices by negative voltage pulses sequentially derived from the pulse amplitude output of said series of electronic amplifying devices; and current amplifier means connected with said control circuit means for furnishing said output current depending upon the potential available from said control circuit, so that said output current is indicative of the straight-line light transmittancy of a fluid existing between said transmitter and receiver means.

5. A system as claimed in claim 1, wherein said amplifier arrangement has amplifier means connected with said photo-sensitive means and capable of delivering an output current proportional to the logarithm of the intensity of said light pulses received by said photo-sensitive means through said beam of light, said amplifier means comprising a series of broad-band electronic amplifying devices having a logarithmic characteristic, and a control circuit including multivibrator means, transformer means connected to the output of said multivibrator means and rectifier means connected to the output of said transformer means so as to cooperate for controlling said electronic amplifying devices by negative voltage pulses sequentially derived from the pulse amplitude output of said series of electronic amplifying devices; current amplifier means connected with said control circuit means for furnishing said output current depending upon the potential available from said control circuit; and means associated with said amplifier means for compensating changes of the performance characteristic of said amplifier means, so that said output current is indicative of the straight-line light transmittancy of a fluid existing between said transmitter and receiver means.

6. A system as claimed in claim 1, wherein said amplifier arrangement has amplifier means connected with said photo-sensitive means and capable of delivering an output current corresponding to the average of the amplitude of said light pulses received by said photo-sensitive means through said beam of light, effecting that said output current is indicative of the straight-line light transmittancy of the atmosphere existing between said transmitter and receiver means and logarithmic recorder means connected to said amplifier means including means for correcting a particular logarithmic indication current diagram, effecting a particular compression of the fog range, said recorder means having a calibration wherein the scale of marked values corresponds to values of light reception of the human eye.

7. A system as claimed in claim 1, wherein said receiver means include an UV-filter in front of said photo-sensitive means for getting higher sensitivity in greater ranges of visibility.

8. A system as claimed in claim 1, wherein said amplifier arrangement has amplifier means connected with said photo-sensitive means and capable of delivering an output current proportional to a predetermined function of the intensity of said light pulses received by said photo-sensitive means through said beam of light, said amplifier means comprising a series of broad-band electronic amplifying devices, and a control circuit including multivibrator means connected to the output of said multivibrator means, transformer means and rectifier means connected to the output of said transformer means so as to cooperate for controlling said electronic amplifying devices by voltage pulses sequentially derived from the pulse amplitude output of said series of electronic amplifying devices, so that said output current is indicative of the straight-line light transmittancy of a fluid existing between said transmitter and receiver means.

9. A system as claimed in claim 1, wherein said amplifier arrangement has amplifier means connected with said photo-sensitive means and capable of delivering an output current proportional to a predetermined function of the intensity of said light pulses received by said photo-sensitive means through said beam of light, said amplifier means comprising a series of broad-band electronic amplifying devices, and a control circuit including multivibrator means connected to the output of said multivibrator means, transformer means and rectifier means connected to the output of said transformer means so as to cooperate for controlling said electronic amplifying devices by voltage pulses sequentially derived from the pulse amplitude output of said series of electronic amplifying devices; and current amplifier means connected with said control circuit means for furnishing said output current depending upon the potential available from said control circuit, so that said output current is indicative of the straight-line light transmittancy of a fluid existing between said transmitter and receiver means.

10. A system as claimed in claim 1, wherein said amplifier arrangement has amplifier means connected with said photo-sensitive means and capable of delivering an output current proportional to a predetermined function of the intensity of said light pulses received by said photo-sensitive means through said beam of light, said amplifier means comprising a series of broad-band electronic amplifying devices, and a control circuit including multivibrator means, transformer means connected to the output of said multivibrator means and rectifier means connected to the output of said transformer means so as to cooperate for controlling said electronic amplifying devices by voltage pulses sequentially derived from the pulse amplitude output of said series of electronic amplifying devices; current amplifier means connected with said control circuit means for furnishing said output current depending upon the potential available from said control circuit; and means for compensating changes of the performance characteristic of said amplifier means, so that said output current is indicative of the straight-line light transmittancy of a fluid existing between said transmitter and receiver means.

11. A system as claimed in claim 8 wherein said receiver means include an UV-filter in front of said photo-sensitive means for getting higher sensitivity in greater ranges of visibility.

12. A system as claimed in claim 1, wherein said amplifier arrangement has amplifier means connected with said photosensitive means and capable of delivering an output current corresponding to the average of the amplitude of said light pulses received by said photo-sensitive means through said beam of light and indicative of the straight-line light transmittancy of the atmosphere existing between said transmitter and receiver means, and recorder means including means for correcting a particular indication current diagram, effecting a particular compression of the fog range, said recorder means having a calibration wherein the scale of marked values corresponds to values of light reception of the human eye.

13. A system as claimed in claim 1, including electronic integrator means cooperating with said amplifier means for integrating the pulses amplified by said amplifier means and producing therefrom said average of the amplitudes of a plurality of received light pulses.

14. In a system for measuring the straight-line transmittancy of gaseous and liquid fluids by means of sequences of light pulses transmitted as a beam from a transmitter at substantially constant pulse frequency and pulse amplitude along a straight-line path over a predetermined distance through such fluids, a receiver apparatus comprising, in combination, optical means spaced from said transmitter and located within the path of said beam of light pulses and adapted to pass at least selected portions of the light spectrum including invisible light; photo-sensitive electric means spaced from said optical means and cooperating therewith for receiving said transmitted light pulses passed through said optical means; a voltage supply connected to said photo-sensitive means for energizing same, said photo-sensitive means delivering one electric pulse in response to each light pulse received, and of an amplitude proportional thereto, the amplitude of each electric pulse depending upon the amplitude of the received light pulse and thus upon the light transmittancy to be measured; amplifier means connected to the output of said photo-sensitive means and including monostable multivibrator means for converting, when said multivibrator means are brought by said electric pulses to saturated condition, said electric pulses into a direct current voltage proportional to the average of the amplitudes of a sequence of said pulses, said multivibrator means being responsive to pulse energy exceeding a predetermined minimum; and indicator means connected to the output of said amplifier means and controlled by the amplitude of said direct current voltage for indicating the prevailing light transmittancy of the fluid passed by said light pulses and represented by said direct current voltage amplitude.

References Cited

UNITED STATES PATENTS

| | | | |
|---|---|---|---|
| 2,852,697 | 9/1958 | Davenport et al. | 250—239 |
| 2,856,542 | 10/1958 | McPheeters | 250—239 |
| 2,860,557 | 11/1958 | Moore et al. | 88—57 |

OTHER REFERENCES

Publication: "Transmissometer For Visibility Measurements," Instruments, vol. 20, December 1947, pp. 1114–1116.

JEWELL H. PEDERSEN, *Primary Examiner.*

RONALD L. WIBERT, *Assistant Examiner.*